(12) United States Patent
Detellis et al.

(10) Patent No.: US 12,391,612 B2
(45) Date of Patent: Aug. 19, 2025

(54) MOISTURE MANAGEMENT IN VERTICAL ROLLER MILLS

(71) Applicant: GCP Applied Technologies Inc., Cambridge, MA (US)

(72) Inventors: Joshua Detellis, Framingham, MA (US); Keith Marsay, Solihull (GB); Jeffrey Thomas, Winchester, MA (US); Thais Araujo, Belo Horizonte-mg (BR); Josephine H. Cheung, Lexington, MA (US); Denise A. Silva, Los Alamitos, CA (US)

(73) Assignee: GCP Applied Technologies Inc., Malvern, PA (US)

( * ) Notice: Subject to any disclaimer, the term of this patent is extended or adjusted under 35 U.S.C. 154(b) by 702 days.

(21) Appl. No.: 17/427,485

(22) PCT Filed: Feb. 1, 2019

(86) PCT No.: PCT/US2019/016309
§ 371 (c)(1),
(2) Date: Jul. 30, 2021

(87) PCT Pub. No.: WO2020/159536
PCT Pub. Date: Aug. 6, 2020

(65) Prior Publication Data
US 2022/0127193 A1    Apr. 28, 2022

(51) Int. Cl.
*C04B 7/52* (2006.01)
*B02C 15/00* (2006.01)
(Continued)

(52) U.S. Cl.
CPC .............. *C04B 7/52* (2013.01); *B02C 15/001* (2013.01); *B02C 25/00* (2013.01); *C04B 28/14* (2013.01);
(Continued)

(58) Field of Classification Search
CPC ....... B02C 25/00; B02C 15/00; B02C 15/001; B02C 15/007; B02C 15/04
See application file for complete search history.

(56) References Cited

U.S. PATENT DOCUMENTS

| 4,204,877 A | 5/1980 | Moorer et al. |
| 6,193,176 B1 | 2/2001 | Mitsuda et al. |
| (Continued) | | |

FOREIGN PATENT DOCUMENTS

| CN | 103949327 | 7/2014 |
| CN | 203830117 U | 9/2014 |
| (Continued) | | |

OTHER PUBLICATIONS

Young, Form PCT/ISA/210, International Search Report for PCT/US2019/016309, Dated Apr. 23, 2019, 2 pages.
(Continued)

*Primary Examiner* — Mohammed S. Alawadi
(74) *Attorney, Agent, or Firm* — Armstrong Teasdale LLP

(57) ABSTRACT

Disclosed are exemplary method and system for manufacturing cement in a vertical roller mill (VRM) using humidity sensor readings. This enables adjustment of operational variables such as material feed, water, grinding additives, air flow, temperature, and their combinations. Exemplary embodiments allow manufacturers to predict and to improve cement properties, such as strength and setting time, by monitoring and managing humidity of air in the VRM and/or its air flow system.

16 Claims, 9 Drawing Sheets

(51) Int. Cl.
    *B02C 25/00*     (2006.01)
    *C04B 20/02*     (2006.01)
    *C04B 28/14*     (2006.01)
    *C04B 40/00*     (2006.01)

(52) U.S. Cl.
    CPC ..... *C04B 40/0032* (2013.01); *B02C 2015/002* (2013.01); *B02C 15/007* (2013.01)

(56) References Cited

U.S. PATENT DOCUMENTS

| | | | |
|---|---|---|---|
| 6,213,415 | B1 | 4/2001 | Cheung |
| 8,100,351 | B2 | 1/2012 | Lohle et al. |
| 9,494,319 | B2 * | 11/2016 | Sutton .................... B02C 25/00 |
| 2006/0272554 | A1 | 12/2006 | Jardine et al. |
| 2015/0014452 | A1 * | 1/2015 | Assmann ................ B02C 15/00 241/62 |
| 2015/0053799 | A1 * | 2/2015 | Storm ................. B02C 15/007 241/31 |
| 2015/0143806 | A1 | 6/2015 | Friesth |
| 2018/0185851 | A1 * | 7/2018 | Wulfert ................. B02C 23/14 |
| 2018/0208506 | A1 | 7/2018 | Dienemann et al. |

FOREIGN PATENT DOCUMENTS

| | | | | |
|---|---|---|---|---|
| CN | 108479955 A | * | 9/2018 | ............ B02C 15/00 |
| JP | H01284344 A | | 11/1989 | |
| JP | 2008080285 A | * | 4/2008 | ............ B02C 15/04 |
| WO | 2018147952 | | 8/2018 | |

OTHER PUBLICATIONS

Young, Form/PCT/ISA/237, Written Opinion of the International Searching Authority for PCT/US2019/016309, Dated Apr. 23, 2019, 8 pages.

Extended European Search Report mailed Aug. 16, 2022 by the European Patent Office for counterpart European patent application No. 19913979.1.

"Reducing Cement Pre-Hydration Could Improve Quality" Cement Optimized Apr. 13, 2018, XP002807159, Retrieved from the Internet: URL: https://cementproducts.com/2018/04/13/reducing-cement-pre-hydration-could-improve-quality/ [retrieved on Jul. 25, 2022].

* cited by examiner

MOISTURE MANAGEMENT IN VERTICAL ROLLER MILLS

FIELD OF THE INVENTION

The invention relates to the field of cement grinding, and more particularly to a method and system for monitoring and managing humidity within a vertical roller mill, thereby enabling control over cement quality.

BACKGROUND OF THE INVENTION

Vertical roller mills (VRMs) have advantages over ball mills for the grinding of cement. These include higher energy efficiency and smaller plant footprint.

However, cements produced in VRMs can have lower quality compared to cements produced in ball mills due to higher levels of "pre-hydration." See Silva, D., Thomas, J., Kazmierczak, D., and Cheung, J., "Pre-Hydration of Cement: Global Survey and Laboratory Results," ZKG International, 71(6) (2018), pp. 55-60.

The term "pre-hydration" is something of an oxymoron. It refers to unwanted reaction from moisture on the surface of the cement particles before they are mixed with water to initiate hydration of the concrete or mortar in which the cement is used. Increased pre-hydration levels arising from cement manufacture leads to increased negative effects in the resultant concretes and mortars.

These negative effects may include: (i) reduction of compressive strength at all ages, with the greatest reductions at early ages; (ii) delayed mortar and concrete setting times; (iii) reduced bulk powder handling properties such as flowability and lump formation; (iv) reduced mortar and concrete slump; and (v) inconsistent chemical additive and admixture performance. These effects have been observed (See e.g., *The American Ceramic Society Bulletin*, Theisen and Johansen, Vol. 54, No. 9, September 1975).

In both VRMs and ball mills, water may be sprayed onto the cement material as it is ground, resulting in pre-hydration. In VRM operations, water is used primarily to stabilize the grinding bed. In ball mills, water is used primarily to cool the finished cement and to control gypsum dehydration. In general, VRM operations use more water than ball mill operations.

The smooth operation of a VRM is highly dependent on the characteristics of the grinding bed, which is the layer of material on top of the grinding table, and in particular the material presented to grinding roller action.

VRM rollers pass over and compress the grinding bed, causing particles to fracture. The grinding bed contains coarse material as well as partially ground material, such as finer particles that have not yet been removed by the classifier.

The presence of very small particles or "fines" remaining on the grinding bed increases vibration problems within VRMs. These vibrations can be serious enough to shake the ground; these vibrations are believed to decrease the life of VRMs. Stable operation of VRMs requires that water be sprayed continuously onto the grinding bed.

Large amounts of water can also be introduced into the VRM along with, or as part of, the raw materials being introduced into the VRM. Water causes the finest of particles within the grinding bed to agglomerate. This makes them behave more like large particles. The practice of applying water to the grinding bed reduces vibrations and enables stable VRM operation.

The use of water spray increases the tendency for cement pre-hydration to occur, and this gives rise to negative effects in the cement products. Conversely, reducing the water spray amount, on the basis of the mass of material feed entering the mill, reduces pre-hydration and improves cement properties (See K. Marsay et al, ICR, August 2017).

The present inventors believe that an effective way to stabilize the grinding bed is to use a grinding aid, which is a chemical that is either applied to raw feed as it enters the mill, or is applied directly to the grinding bed. The use of a grinding aid to stabilize the bed allows the water spray to be reduced, thus reducing pre-hydration, and may also allow the production rate to be increased. Grinding aids are believed to stabilize the bed by dispersing the particles. Specifically, grinding aids reduce the tendency for fine particles to stick to larger particles, or to each other.

As a result of this dispersing effect, fine particles pass more readily through the classifier and into the finished cement product, which facilitates an increase in mill production and reduces the proportion of fine particles in the grinding bed of the VRM. The grinding bed is more stable, and grinding is more efficient.

VRMs are generally designed and built with modern control systems that measure and control various parameters of the mill operation. These parameters include: the composition of the feed entering the mill, the rates at which the feed components enter the mill, the water spray rate, the grinding aid dosage, acceptable levels of grinding vibrations, the rotation speed of the separator, the position of dampers that control the airflow in the mill, the temperature and air pressure at various points in the mill, and many others. These parameters are all visible from displays in a mill control room, where an operator can make adjustments as needed to keep the mill running properly and to maintain the desired cement composition and fineness. Furthermore, some VRMs also have control software that performs many of the necessary adjustments automatically. For example, the software will typically increase the rate of water spray if the level of grinding vibrations grows too high.

The present inventors note that existing VRM measurement and control systems are primarily designed to prioritize cement production, rather than to improve or optimize cement quality while maximizing production.

In particular, existing VRM measurement and control systems do not measure pre-hydration of the cement manufactured, and thus cannot take into consideration the negative effects of pre-hydration on the performance of the cement produced.

In view of the foregoing, the present invention provides a novel method and system for predicting the quality of the cement manufacturing in VRMs, and for making adjustments to VRM operations to improve cement quality in real time, while simultaneously safely operating the VW.

SUMMARY OF THE INVENTION

In surmounting the disadvantages of prior art approaches (as described partly in the foregoing background section), the present inventors believe that a novel and inventive approach begins with the realization that the amount of water spray is not the only factor that determines the level of pre-hydration of cement particles being ground in vertical roller mills (VRMs).

More precisely, the present inventors believe that it is exposure of the cement particles to humid air as they are carried by air flow through the VRM and its associated air flow system that promotes unwanted pre-hydration. This is particularly true if the air flow system is one that recirculates the moist air used to transport the ground particles through the VRM and to the de-dusting unit back into the VRM.

Therefore, the present inventors believe that real-time monitoring of the level of moisture in the air (for example, the relative humidity of the air) within a VRM is a preferred way to track the potential for cement pre-hydration.

There are a number of factors that, to some degree or other, affect the relative humidity (RH) of the process air inside the mill, including:
 (A) amount of water sprayed onto the grinding bed;
 (B) amount of fresh air introduced into the VRM;
 (C) amount of process air recirculated back into the VRM (in those VRMs which have air flow recirculation systems);
 (D) temperature of process air in the VRM;
 (E) moisture resulting from fuel combustion in a hot gas generator;
 (F) amount of dehydration of gypsum that occurs inside the VRM;
 (G) amount of moisture in raw feed material (e.g., clinker, limestone, pozzolan, etc.) fed into the VRM; and
 (H) humidity of fresh air introduced into the VRM.

These factors may be considered within an active moisture management strategy for operating VRMs.

As water spray was previously discussed, the other factors are discussed below.

Factors (B) and (C) are related and together can influence the rate at which moisture is removed from the mill, such as through an exhaust chimney attached to the air flow system.

The temperature (D) does not affect the absolute humidity level of the air in the mill, but has a strong effect on relative humidity (RH). For a given moisture content, higher temperature results in lower RH. Temperature changes can be used as part of a strategy to minimize pre-hydration and improve cement quality. However, it should be recognized that the mill temperature is subject to other operational constraints that may limit the range in which it can be varied.

Factor (E) refers to the use of a hot gas generator, which burns fuel to produce heat that is used to maintain the desired temperature inside the VRM. Water vapor formed as a byproduct of the combustion process is part of the overall moisture content of the process air in the VRM.

Factor (F) refers to the conversion of gypsum into plaster at the elevated temperature of a mill. Conversion of 1 mole of gypsum into 1 mole of plaster releases 1.5 moles of $H_2O$, which adds to the moisture content of the air inside the mill. In fact, most VRMs convert little or no gypsum into plaster due to their relatively low operating temperatures and residence times (compared to ball mills).

However, for those VRMs that do convert a significant proportion of gypsum to plaster, the associated moisture release is an advisable factor to consider.

Factor (G), the raw material moisture, varies considerably from VRM to VRM and can vary from day to day from a particular source. In some cases it is the single largest contributor to the moisture inside the VRM. When changes occur in the raw material moisture contents, it may be necessary to adjust the proportions of these materials in the final cement product or to make other adjustments to the mill operation in order to maintain cement quality.

Factor (H), the moisture in the fresh air, is generally a fairly small contributor to the overall moisture content of the VRM. It is generally not practical to try to remove moisture from the air before it enters the VRM. The air inside a VRM being used to make cement will almost always have a higher moisture content than the air outside of the VRM (including its air flow system) due to the combined effect of factors A, E, F, and G. Therefore, introducing fresh air into the VRM will lower the RH inside the VRM under almost all circumstances.

Most VRMs are designed and operated in a manner such that most of the process air that is used to carry the ground cement up to the VRM classifier, which is located above the roller(s) and grinding table within the VRM housing, is recirculated back to the grinding table instead of being vented out of the chimney. This has the advantage of reducing the amount of heating of the VRM that is required to achieve a desired temperature, since this air is already hot. However, this has the unwanted effect of building up the level of moisture within the VRM.

In general, a higher proportion of recirculated air in the VRM air flow system will lead to a higher moisture content in the air and thus a greater tendency to pre-hydrate the cement. This concept can be understood and quantified by considering the VRM to be a closed system running under equilibrium conditions with respect to moisture. This means that the rate at which moisture enters the VRM (by factors A-H described above) is equal to the rate at which moisture leaves the VRM. While there are multiple sources of input moisture, there is only one primary source of moisture exiting the VRM, which is the exhaust gas stream up the mill chimney (e.g., a stack by which air exits form the VRM's associated air flow system).

In current VRM designs and practices, the present inventors believe that the humidity of the air in the VRM will depend strongly on the rate of airflow out of the VRM chimney. If the exit airflow is low, the moisture concentration will tend to be high. If exit airflow is increased while maintaining the same rate of moisture leaving the chimney, it will result in a lower humidity value since the same amount of moisture will be conveyed by a larger volume of air.

In exemplary embodiments of the present invention, the rate of VRM exit airflow is monitored and adjusted, such that the humidity within the VRM air flow system (particularly a recirculation system) is significantly reduced at a fixed input moisture content (i.e., without reducing water spray or other factors). Also, the present inventors believe that both water spray reduction and VRM air flow adjustments can be performed to give the best results in terms of reduced pre-hydration of the cement.

Other exemplary embodiments of the invention are set forth in the next paragraphs.

An exemplary method of the present invention for manufacturing cement, comprises:
 (A) grinding particles that comprise clinker and a sulfate source chosen from gypsum, plaster, calcium anhydrite, or blend thereof, in a vertical roller mill that comprises a grinding table, at least one rotatable roller in rolling contact with the grinding table to grind the particles, a classifier for removing ground particles from the mill, an air flow system to carry particles from the grinding table through the classifier, and at least one dispenser apparatus for introducing water, cement grinding aid, or both, onto the grinding table or onto the particles before or during grinding on the grinding table;
 (B) providing at least one humidity sensor that provides an output corresponding to moisture level of air inside the VRM or the air flow system;
 (C) comparing output from the at least one humidity sensor with (i) a predetermined humidity threshold level or range; (ii) at least one data set or mathematical relationship that contains correlations between humidity sensor output and one or more physical or chemical properties of the corresponding finished cement, hydrated cement, or cementitious product made with the cement; or (iii) both (i) and (ii); and (D) initiating, based on the comparison in Step C, at least one protocol chosen from: (i) providing a visual or auditory alarm that a humidity threshold value is met or exceeded; (ii) adjusting water, cement grinding aid, or both as dispensed onto the grinding table or particles being ground on the grinding table; (iii) adjusting air flow entering or exiting the mill or the air flow system; (iv) adjusting temperature of air inside the mill or the air flow system; (v) adjusting amount of materials introduced into the mill; or (vi) a combination thereof.

An exemplary system for manufacturing cement, comprises:

(A) a vertical roller mill comprising: a grinding table for grinding particles comprising clinker and a sulfate source chosen from gypsum, plaster, calcium anhydrite, or blend thereof; at least one rotatable roller for providing rolling contact with the grinding table to grind the particles; a classifier for removing ground particles from the mill; an air flow system to carry particles from the grinding table through the classifier; and at least one dispenser apparatus for introducing water, cement grinding aid, or both, onto the grinding table or the particles before or during grinding on the grinding table;

(B) at least one humidity sensor that provides an output corresponding to moisture level of air inside the VRM or the air flow system;

(C) a processor for comparing output from the at least one humidity sensor with (i) a predetermined humidity threshold level or range; (ii) at least one data set or mathematical relationship that contains correlations between humidity sensor output and one or more physical or chemical properties of the corresponding finished cement, hydrated cement, or cementitious product made with the cement; or (iii) both (i) and (ii); and (D) the processor programmed to initiate, based on the comparison, at least one protocol chosen from: (i) providing a visual or auditory alarm (that a humidity threshold value is met or exceeded); (ii) adjusting water, cement grinding aid, or both being dispensed onto the grinding table or the particles ground on the grinding table; (iii) adjusting air flow entering or exiting the grinding mill or air flow system; (iv) adjusting temperature of air inside the grinding mill or air flow system; (v) adjusting amount of materials introduced into the grinding mill; or (vi) a combination thereof.

In further exemplary methods and systems of the invention, the processor is in electrical or electronic communication with various humidity and temperature sensors within and outside of the VRM and/or the air flow system; and the processor is also communicative with stored data chosen from cement strength, initial set time, pre-hydration level, humidity, and relationships between at least two of the foregoing.

Further advantages and features of the invention will be described in further detail hereinafter.

BRIEF DESCRIPTION OF THE DRAWINGS

An appreciation of the benefits and features of the present invention may be more readily comprehended by considering the following written description of exemplary embodiments in conjunction with the drawings, wherein.

DETAILED DESCRIPTION OF EXEMPLARY EMBODIMENTS

Figure 1:
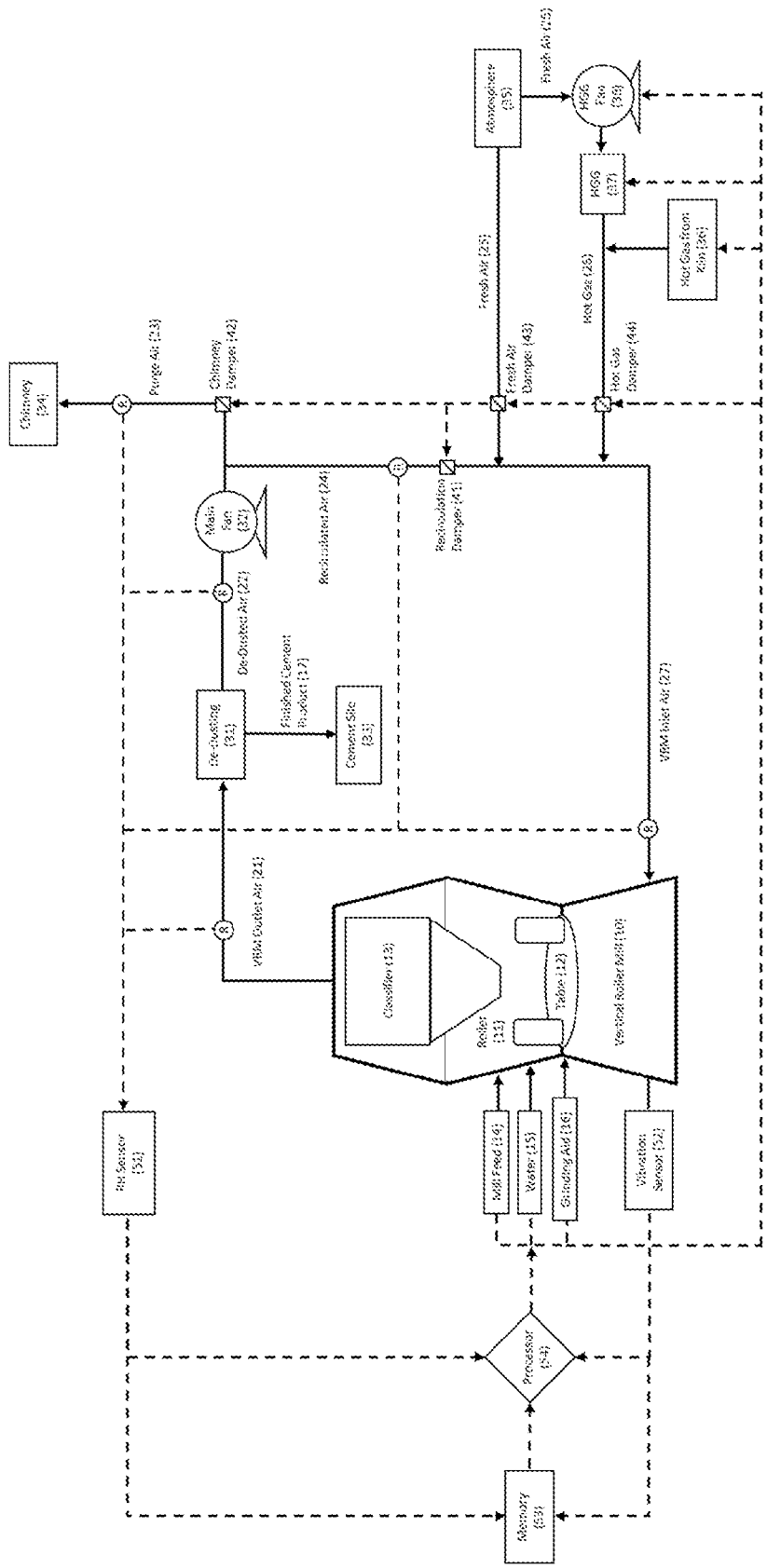
FIG. 1 is a schematic flow diagram of an exemplary embodiment for monitoring moisture to prevent/minimize pre-hydration of cement being ground in a vertical roller mill (VRM), wherein possible probe locations are illustrated.

The phrase "absolute humidity" as used herein refers to the mass of water vapor per unit volume of air. This is most often expressed in units of grams of water per cubic meter of air.

The phrase "relative humidity" (RH) as used herein shall refer to the absolute humidity divided by the maximum absolute humidity level that the air can have at its current temperature and pressure. RH is normally expressed as a percentage between 0% and 100%.

The "maximum absolute humidity" of air is the level at which, if any further moisture were added, condensation would occur whereby moisture would form as liquid water. This is also referred to as "fully saturated" air. The maximum absolute humidity level of air will change with temperature and pressure. For the purpose of this disclosure, the pressure is assumed to remain nearly constant so the focus is on temperature changes. Because air can hold more water vapor at higher temperatures, the "relative humidity" (RH) of air will drop as it is heated, even if no water is added or removed. For example, fully saturated (100% RH) air at room temperature (about 20° C.) will have an RH of only 5% once it is heated to 85° C.

Another way of expressing the amount of water vapor in the air is the "dew point," a term referring to the temperature at which water condenses because the air is fully saturated with moisture (100% RH). At constant pressure, the dew point can only be lower or equal to current air temperature. Dew point is thus a measure of the absolute amount of water vapor in the air, as it does not vary with air temperature. Dew point values can be calculated from absolute humidity, and vice versa.

The present inventors contemplate that any of the above-mentioned measures of water content in air (absolute humidity, relative humidity, dew point) can be employed. It is preferable, however, that air temperature also be taken into consideration in the context of managing and monitoring VRM cement grinding. Measurement and control of VRM temperatures is routine, and should not be burdensome to the practice of the present invention as disclosed herein.

The present inventors believe that the concept of relative humidity (RH) is especially beneficial in discussing correlations between pre-hydration and cement quality. If one prefers to measure dew point or absolute humidity of the air considered in combination with temperature measurements, this would be reasonable, as RH can be calculated from these measurements. In other words, while RH may be used to describe various preferred embodiments, e.g., instruments having RH value outputs for sampling air moisture, it should be understood that instruments may be employed for outputting absolute humidity levels or dew point values (or some other parameter related to humidity), and these various values can be converted to RH (using the temperature) if desired.

The term "Portland cement" or "cement" as used herein includes hydratable cement which is produced by pulverizing clinker consisting of calcium silicates and one or more forms of calcium sulfate (e.g., gypsum) as an interground additive. Cement is the binder that holds together aggregates to form mortar and concrete structures.

The present invention provides a method and system useful for enhancing the grinding efficiency and resulting quality of cementitious materials such as Portland cement, fly ash, granulated blast furnace slag, limestone, natural pozzolans, or mixtures thereof. Typically, Portland cement is combined with one or more other cementitious materials and provided as a blend. The method and composition of the invention, however, can be used separately for grinding Portland cement, or any of the other cementitious materials, independently or in any combination.

As mentioned in the Background section, the term "pre-hydration" refers to undesirable reaction with moisture at the surface of cement particles that occurs at some point before the cement particles are mixed with water to make concrete or mortar. The reaction products resulting from pre-hydration tend to form a compact layer around the cement particles that limits the rate of dissolution of the cement particles when used to make concrete or mortar. This tends to delay setting and strength development. This also tends to interfere with chemical additives and concrete admixtures such as water reducers, rendering them less effective. The pre-hydration reaction of only a small mass fraction (<1%) of the cement will cause these various negative effects to become evident. It is difficult to mitigate effects of pre-hydration by using accelerators or traditional cement-quality improving chemicals.

Pre-hydration can occur at any point from the time the clinker leaves the kiln until the time the concrete is made. Pre-hydration often occurs during the cement grinding process in vertical roller mills (VRMs). VRMs are more prone to causing cement pre-hydration as compared to ball mills due to the water spray used for vibration reduction within VRMs; and also due to the tendency of VRM operators to recirculate moist air within the VRM through the air flow recirculation circuit (See Silva, D. Thomas, J., Kazmierczak, D., and Cheung, J., "Pre-Hydration of Cement: Global Survey and Laboratory Results," ZKG International, 71(6) (2018), pp. 55-60.)

The level of pre-hydration can be measured by heating a cement sample and measuring the weight loss within a defined temperature range. This weight loss results from the thermal decomposition of pre-hydration products that formed during the pre-hydration reaction. Pre-hydration is most accurately measured using a thermogravimetric analysis (TGA) instrument.

The pre-hydration level of a cement sample can be quantifiably measured for present purposes and designated using the symbol $W_k$, which is defined herein as the percentage mass loss of a cement sample as it is heated, starting just after the gypsum finishes dehydrating (about 150° C.) and finishing just before the portlandite within the cement starts to decompose (about 375° C.).

The term grinding additive (or grinding aid) is used here to denote any chemical compound that, when added to the raw feed or to the grinding bed, has a beneficial effect on the grinding process of the VRM, such as reduced milling vibrations and/or increased mill throughput. Some chemical compounds that provide such processing improvements also provide additional benefits to the cement performance properties (such as strength development). Such chemical compounds are included in the present definition of a grinding additive or aid.

Exemplary grinding additives or aids contemplated for use in the present invention may be chosen from alkanolamines, glycols, glycerine, or mixtures thereof.

Examples of alkanolamine grinding additives include triisopropanolamine, diethanol-isopropanolamine, diisopropanol-ethanolamine, tetrahydroxyethylethylenediamine, tetrahydroxyiso-propylethylenediamine, triethanolamine, methyldiethanolamine, and diethanolamine.

Examples of glycol grinding additives include diethylene glycol, triethylene glycol, dipropylene glycol, tripropylene glycol, tetrapropylene glycol, and hexylene glycol.

Exemplary grinding additives may alternatively comprise acetic acid, acetate, or salts (for example, sodium chloride, calcium chloride, calcium nitrite, calcium nitrate, sodium gluconate), and hydroxyl carboxylic acids (for example, corn syrup, molasses, citric acid, sucrose).

Optionally, a defoaming agent, such as tri-iso-butyl phosphate, may be employed with any of the foregoing grinding additives or combinations.

The foregoing exemplary grinding aids may be used in percentages as known to those of ordinary skill.

FIG. 1 is a diagram of an exemplary embodiment of the present invention in which a relative humidity (RH) sensor (51) can be used to monitor the moisture level within a vertical roller mill (VRM) (10) or its associated air flow system. Solid dark lines symbolize the channels or ducts for conveying air and cement particles around the VRM air flow system; and dashed lines symbolize connections (electrical or electronic) for transferring signals from the sensor(s) to the computer processor (54) and/or processor-accessible memory (53). The at least one RH sensor (51) may be positioning within the air flow exiting (21) from the VRM classifier (13); or it may be positioned at other locations within the air flow system associated with the operation of the VRM, such as between de-dusting equipment (31) and fan (32); or at the air inlet (27) which feeds air into the VRM (10).

While the phrase vertical roller mill (10) and its acronym "VRM" may be primarily used to designate the table (12), roller(s) (11), and integrated classifier (13), this phrase and acronym may also be used, depending on context, to designate an exemplary air flow outlet (21) from the VRM, an exemplary air inlet (27) into the VRM, and an exemplary air flow system (24) which includes outlet and inlet (21/27).

Vertical Roller Mills (VRM) as shown at (10) of FIG. 1 typically comprise at least one vertical roller (11) and sometimes two to six or more rollers in rolling contact with material to be ground (the "grinding bed") on a horizontal rotating table (12). Mill feed (14) in the form of cement clinker, gypsum, and other supplementary materials (including but not exclusively, limestone, pozzolan, blast furnace slag and any combination thereof) is typically introduced to the VRM towards the center of the table (12), and becomes crushed between the rollers (11) and table (12). The table (12) rotates at a speed sufficient to move the particles outward under the path of the roller(s) (11) and over the outer edge of the table (12). An air stream transports the particles upwards toward a classifier (13) contained within the same VRM housing. Sufficiently fine particles are passed through the classifier to become finished cement product; while coarser material is returned to the grinding table (12).

VRM outlet air (21) that leaves the mill housing conveys the ground fine cement particles to "de-dusting" equipment (31). A main fan (32) generates negative pressure that pulls air from the VRM (10) through the de-dusting equipment (31), which employs one or more bag filters and/or cyclonic separators. It is at this stage (31) where the finished cement product (17) is separated from the de-dusted air (22) and sent to a silo (33) for storage. After passing through the main fan (32), the air is split into purge air (23) that exits the airflow system through the chimney (34), and recirculated air (24) that flows back to the VRM (10). The proportions of air directed to the chimney (34) and recirculated to the VRM (10) are mainly controlled by the chimney damper (42) and the recirculation damper (41). Although not illustrated in FIG. 1, some air flow systems have additional de-dusting equipment and/or a fan located in the purge air stream. This is more common in air flow systems where the primary de-dusting equipment (31) is a cyclone separator. The specific airflow configuration shown in FIG. 1 is for illustration purposes and is not meant to limit the invention in any way. For example, there are some air flow systems that have zero recirculated air (24), and therefore all air that exits the VRM goes through the de-dusting equipment (31) and then leaves the system through the chimney (34).

A fresh air damper (43) is used to admit fresh air (25) from the external atmosphere (35), and a hot gas damper (44) admits hot air (26) from a hot gas generator (HGG) (37) or from a kiln (36) into the VRM (10).

While FIG. 1 illustrates fresh air (25) being introduced before hot gas (26) is introduced, it is sometimes the case that the hot gas (26) may be introduced before or along with the fresh air (25) stream. The hot gas can either come from recycled hot gas from a nearby process such as a cement kiln (36), or be made using a hot gas generator (37). Hot gas generators (HGG) will burn a fuel to produce heat for the VRM to help maintain the desired VRM grinding temperature. The air that transports the hot gas from the HGG (37) can come from the recirculated airflow stream (24) or from the outside environment (35) as illustrated in FIG. 1. Often, an HGG fan (38) is used to help transport this air. The rate of fuel consumption in the HGG (37) can be altered to help control the amount of heat in the hot gas (26) air stream. It should also be noted in cases where the fresh air ducts are too small to supply the desired volume of fresh air, the hot gas stream can be converted into a fresh air stream. This can be done by turning off the HGG (37) or closing the kiln air damper, and drawing fresh air from the outside environment through the HGG into the airflow system. Additionally, the HGG fan (38) can be used to help further increase the volume of fresh air through the hot gas ducting.

The VRM inlet air (27) is controlled by several dampers, each mainly controlling a specific air stream. However, due to the integrated nature of air pressure throughout the airflow system, each damper also impacts the system as a whole. Closing a damper restricts the volume of air that passes through the damper, while opening a damper will increase the air flowing through the specific damper. It is advantageous in terms of cement properties and for proper VRM operation that the total airflow through the VRM remain within a range that allows for stable VRM operation. In more modern VRM airflow systems, a variable-speed fan also can be used to help control the airflow.

In addition to providing an illustrative diagram of a VRM, FIG. 1 also illustrates schematically an exemplary embodiment of the present invention wherein a control loop is used to monitor and control relative humidity (RH). One or more RH sensors (51) for measuring the temperature and moisture content of the air can be located at various locations throughout the air flow system, such as, for example, at the locations designated as the VRM outlet air (21), in the air flow stream located after the de-dusting equipment (22), in the recirculated air duct (24) before the fresh air (25) or hot gas (26) inlets or sources, in the purge air (23) directed out of the system, and/or at the VRM air inlet (27).

Preferred locations for an RH sensor (51) include the location at the exemplary de-dusted air flow stream (illustrated in FIG. 1 at 22) and/or exemplary purge air (23) flow which is conveyed to or through the chimney (34), exemplary recirculated air (24), and exemplary VRM inlet air (27).

The vibration sensor (52) measures the vibrations generated from the VRM operation, and is typically located on the outside body of the VRM or on the gearbox of the motors rotating the grinding table (12). One or more vibration sensors are standard on a VRM because safe operation requires monitoring and controlling VRM vibration within set limits. Both the RH sensor (51) and vibration sensor (52) are preferably integrated with computer memory (53) and processor (54). The processor (54) compares the measured RH and mill vibrations with the set point values stored in the memory (53). The processor can make adjustments to the rate of mill feed (14), water spray (15), and grinding aid (16), as well as the recirculation damper (41), chimney damper (42), fresh air damper (43), hot gas damper (44), the amount of hot gas from the kiln (36), fuel being consumed in the HGG (37), and the HGG fan (38).

Humidity probes that are believed suitable for the purposes of the present invention are commercially available. An RH probe should have an extended housing with sufficient length (e.g., 12-18 inches) for extending into the chimney or into ductwork for the air flow channels at any of the locations describe above (e.g., locations designated as at 21, 22, 23, 24, or 27 in FIG. 1) and separate housing for the associated electronics which can be mounted outside the air duct for logging continuously the probe readings. The unit must be rugged enough to operate reliably in the hot and dusty environment of the cement mill. RH sensors are commercially available from various suppliers.

Also as shown in FIG. 1, computer memory (53) keeps an electronic historical record of signals or measurements from the vibration sensor (52) and at least one humidity sensor (51). In accordance with exemplary embodiments of the present invention, based on inputs from one or more of these sensors (51 and/or 52), the processor 54 may be programmed to send one or more electronic signals to adjust the quantity of mill feed (14), water (15), and grinding aid (16) injected into the VRM (10), and to control one or more of the various dampers (41/42/43/44) relative to the recirculation, chimney, fresh air, and hot gas air flow channels, as well as the amount of hot gas (26) being admitted from the kiln (36), fuel consumption in the HGG (37), and the volume of air being pushed into the airflow system from the HGG fan (38).

The present inventors have found that the higher the relative humidity (RH) of the air inside the VRM and its associated air flow system, the higher the pre-hydration level of the cement ground by the VRM. This is supported by FIG. 2, which shows the pre-hydration level of several cement samples made with a VRM during the same two-day period plotted against the relative humidity of the air-flow exiting the chimney at the time that each cement sample was taken (the location of RH probe being designated at (34) in FIG. 1. Evident in FIG. 2 is a clear trend of pre-hydration level decreasing as relative humidity (RH) level decreases.

Figure 2:
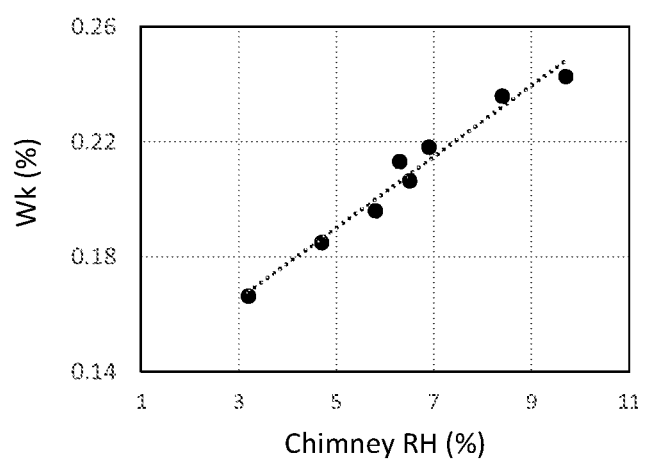
FIG. 2 is a graphic illustration of pre-hydration level of cement (Wk) made in a VRM plotted against the relative humidity of air exiting from the VRM.

The relationship between the RH of the air inside the mill and the resulting pre-hydration level Wk of the cement being manufactured, as illustrated by FIG. 2, is surprising and furthermore provides an opportunity for a real-time indication of cement quality by monitoring the RH level with a commercially available instrument designed for that purpose.

It is believed by the present inventors that relative humidity (RH) levels in VRMs used to manufacture cement range widely from about 2% to 40%. The inventors further contend that it is usually possible to reduce the RH of the air inside a VRM by carefully and thoughtfully adjusting parameters that include, but are not limited to: the water spray level, the amount of fresh air entering the mill, the amount of moist process air exiting the chimney, and the mill temperature. Such mill adjustments were used to generate the changes in RH plotted in FIG. 2.

Figure 3:
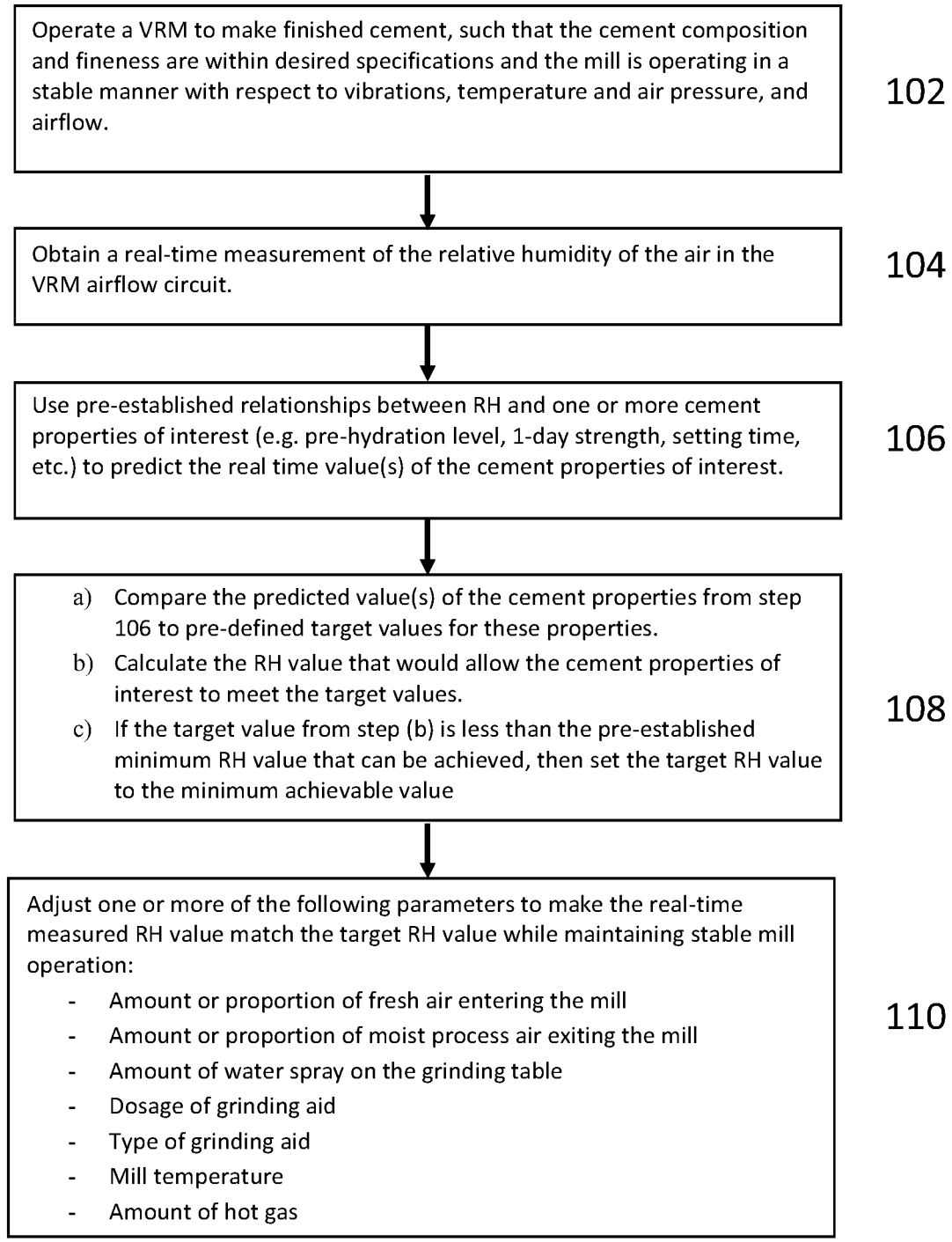
FIG. 3 is a block diagram of exemplary control loop logic for adjusting and maintaining a set point relative humidity level within a VRM.

An exemplary method and system for maintaining and improving cement quality by controlling the moisture during grinding manufacture of cement is illustrated in FIG. 3.

In block 102 of FIG. 3, a VRM is operated to make a finished cement product according to desired specifications of cement composition and fineness. This cement composition is controlled by adjusting the rates at which clinker, gypsum, and other supplementary raw materials are fed into the mill. The fineness of the cement is controlled by adjusting the settings of the classifier, which removes the fine particles from the mill. The mill should be operating in a stable manner with respect to milling vibrations, temperature, air pressure and air flow within the airflow system. This operation will in almost all cases include spraying water at a fixed rate onto the grinding bed to facilitate stable grinding.

In block 104, the RH of the air circulating or exiting the mill is measured in real time, or at regular preset intervals (e.g. every 5 minutes or less). When the mill is operating in a stable manner as described in block 102, then the measured RH values should be constant and be reflective of the moisture content of the air everywhere in the airflow system.

In block 106, pre-established relationships between RH and one or more cement property of interest are used to predict the current values of these properties of interest. Such properties could include: pre-hydration level, setting time, strength at a given age, cement flowability, slump retention, admixture compatibility, or any other parameters known to be affected by moisture and pre-hydration. These relationships could be developed by performing laboratory tests in which the property of interest is measured for multiple cement samples that were ground under different RH conditions. Ideally the cement samples used to develop the relationship would be of the same or similar composition and fineness as the cement being currently made. However, variation in these parameters could also be accounted for. For example, to predict the setting time, a relationship between RH and setting time and a relationship between cement fineness and setting time could be used together to predict the setting time of the cement currently being manufactured. In this way, a real time measurement of RH is used to provide rapid feedback as to the quality and performance of the cement currently being manufactured, which is highly useful.

In block 108, the predicted cement property values from block 106 are compared to target values for these properties. Target values could represent a minimum performance level that the cement must meet, or an acceptable range for a parameter. If the one or more predicted values meet all of the target values, then no action needs to be taken. If one or more of the predicted values do not meet the target values, then the pre-established relationships described in block 106 are used to calculate the RH value that will allow all target values to be met. For example, if a performance target is for the setting time to be no longer than 140 minutes and the current predicted setting time is 160 minutes, then the RH value that will give a 140 minute setting time is predicted, and this becomes the new target RH value.

In block 110 the mill operation is adjusted so that the real-time measured RH value matches (or is less than) the target RH value established in block 108. Several parameters that are directly or indirectly related to the RH level are listed in block 110 of FIG. 3. While this list includes the most readily and easily adjusted parameters, it is not meant to be exhaustive or to limit the invention. Strategies for reducing the RH in accordance with block 110 are discussed in further detail in the following paragraphs.

The RH can be reduced by reducing the water spray rate onto the grinding bed. For example, when the measured RH is above target, the processor will determine if water spray level can be reduced without causing mill vibrations to increase above a maximum acceptable level (which can be for example selected into the processor). If mill vibrations are below the acceptable level, the water injection rate is slowly reduced until the measured RH meets the target value or the mill vibrations reach the acceptable value. If mill vibrations increase to the maximum acceptable value, the dosage of grinding aid is increased slowly until mill vibrations decrease below the acceptable level. At this point the water spray rate can be lowered further. Multiple steps of increasing the grinding aid dosage and reducing the water spray level can be performed in order to reach the target RH level. Alternatively, the composition of the grinding aid may be changed in order to facilitate a reduction in milling vibrations.

It should be noted that other limitations may affect the ability to reach the target RH. For example, the dosage of a particular grinding aid may have a maximum level that has been determined to avoid having an unwanted effect on the finished cement, or because of cost, or other reasons.

The RH can also be reduced by adjusting the airflow system to increase the rate at which moist process air exits the system. A practical way to do this is to increase the amount of fresh air entering the air flow system while simultaneously increasing the amount of moist air exiting the air flow system at the chimney, leaving the total air flow rate through the mill constant.

The RH can also be reduced by increasing the temperature of the VRM. For air with a fixed absolute moisture concentration, the higher the temperature of the air, the lower the RH. We turn now to a description of various example embodiments of the invention as follows.

In a first example embodiment, the present invention provides a method for manufacturing cement, comprising:
  (A) grinding particles that comprise clinker and a sulfate source chosen from gypsum, plaster, calcium anhydrite, or blend thereof, in a vertical roller mill that comprises a grinding table, at least one rotatable roller in rolling contact with the grinding table to grind the particles, a classifier for removing ground particles from the mill, an air flow system to carry particles from the grinding table through the classifier, and at least one dispenser apparatus for introducing water, cement grinding aid, or both, onto the grinding table or onto the particles before or during grinding on the grinding table;
  (B) providing at least one humidity sensor that provides an output corresponding to moisture level of air inside the VRM or the air flow system;
  (C) comparing output from the at least one humidity sensor with (i) a predetermined humidity threshold level or range; (ii) at least one data set or mathematical relationship that contains correlations between humidity sensor output and one or more physical or chemical properties of the corresponding finished cement, hydrated cement, or cementitious product made with the cement; or (iii) both (i) and (ii); and
  (D) initiating, based on the comparison in Step C, at least one protocol chosen from: (i) providing a visual or auditory alarm that a humidity threshold value is met or exceeded; (ii) adjusting water, cement grinding aid, or both as dispensed onto the grinding table or particles being ground on the grinding table; (iii) adjusting air flow entering or exiting the mill or the air flow system; (iv) adjusting the temperature of air inside the mill or the air flow system; (v) adjusting the amount of materials introduced into the mill; or (vi) a combination thereof.

In a first aspect of the first example embodiment, one or more relative humidity (RH) sensors (51) can be located at a VRM outlet air flow (21), within the de-dusted air flow stream (22), at or within the chimney (34), within the recirculated air flow (24) stream after the chimney damper (42), and/or at the inlet (27) back into the housing for the VRM (10).

In a second aspect of the first example embodiment, humidity sensor readings may be taken every 15 minutes; more preferably, humidity sensor readings may be taken every 5 minutes; and, most preferably, every 60 seconds or less. Indeed, the humidity sensor output can be fed continuously to a processor, which can compare the output or outputs to predetermined humidity threshold values or to data sets or mathematical relationships that are based on correlations or relationships between previously obtained humidity outputs and cement properties.

In a third aspect of the first example embodiment, a processor is used for monitoring humidity within the VRM or its associated air flow system (which is preferably configured to re-circulate a portion of the air back into the mill) and for comparing the monitored humidity with a stored humidity value or range, and for making at least one adjustment, as described in step (D), to bring the monitored humidity towards the stored humidity value or with the stored humidity range. The processor is programmed to initiate and to reiterate these activities as needed or desired.

In a second example embodiment which may be based on the first example embodiment above, the method further comprises providing a vibration sensor that senses vibration of the vertical grinding mill and provides an output indicative of vibration level.

In a first aspect of the second example embodiment, the method further involves providing a processor that receives the vibration sensor output and compares it to a predetermined vibration threshold level, the processor being programmed or configured to initiate step (C), step (D), or both steps (C) and (D), when the predetermined vibration threshold level is exceeded.

The term "vibration sensor" as used herein includes sensors which detect mechanical vibrations (e.g., accelerometer), sound vibrations (e.g., transducer or other noise sensor), or visually detectable vibrations (e.g., laser, photometric sensor); or a combination of two or more of these modes. Thus, "vibration" sensor could include any device that detects when the grinding mill is not running smoothly.

In a third example embodiment, which may be based on any of the first through second example embodiments above, the method further comprises, in step (C), the processor receiving an output from the at least one humidity sensor, and, based on comparing output from the at least one humidity sensor with a predetermined humidity threshold level or dataset, initiating a protocol whereby water amounts introduced into the grinding mill or onto the particles being ground in the grinding mill are reduced, while cement grinding aid amounts introduced into the mill or onto the particles being ground in the grinding mill are increased, or the grinding aid composition is changed, or both.

In a fourth example embodiment which is based on any of the first through third example embodiments above, the method further comprises, in step (C), the processor receiving an output from the at least one humidity sensor, and initiating an adjustment to water level and cement grinding aid amount being dispensed into the grinding mill, said adjustment being limited by a vibration level limit or predetermined maximum value.

In a fifth example embodiment which is based on any of the first through fourth example embodiments above, the method further provides, in step (C), the processor receiving an output from the at least one humidity sensor and comparing the output to a predetermined humidity threshold level or dataset at successive intervals of no greater than every 60 minutes.

In a first aspect of this fifth example embodiment, the humidity sensor readings may be taken every 15 minutes; more preferably, humidity sensor readings may be taken every 5 minutes; and, most preferably, every 60 seconds or less.

In a sixth example embodiment which is based on any of the first through fifth example embodiments above, the method further comprises, in steps (B) through (D), the processor programmed to initiate step (C) when there is a change in the types or amounts of clinker, sulfate source, or other particle materials being ground in step (A).

In a first aspect of this sixth example embodiment, a sensor can be used to detect when there is a change in the type or amount of clinker, sulfate source, or other particle materials being ground in step (A), or when the composition or internal structure of one of these components changes.

In a second aspect of the sixth example embodiment, the sensor used to detect a change as described above in the first aspect can be an infrared spectroscopy instrument (for example, a near IR sensor).

In a third aspect of this sixth example embodiment, information about a change in the type, composition, or internal structure of the clinker being introduced into the VRM can be used by the processor (such as the VRM system processor) that is programmed to receive and to monitor the output of one or more humidity sensors in the VRM and/or air flow system (such as a humidity sensor in an exhaust stack) and compare the output to datasets previously stored in processor-accessible memory locations. The datasets could represent correlations between the humidity level values and corresponding strength data for the specific type of cement clinker being ground (for example, as may have been previously established by empirical means or as may be reflected in look up tables).

In a fourth aspect of this sixth example embodiment, the processor is programmed to consider the specific type of cement being manufactured, and to compare signals from the at least one humidity sensor to a predetermined signal or a stored dataset in accordance with the cement type being ground. The cement type refers to specific values or ranges associated with the composition of the cement (e.g., amounts of clinker, gypsum, and other cementitious materials) particle size distribution, or any other parameters that are specified in order to produce a cement product with well understood and predictable properties.

In a seventh example embodiment which is based on any of the first through sixth example embodiments above, the method further comprises, in step (D), the one or more physical or chemical properties being chosen from pre-hydration level, compressive strength, initial setting time, final setting time, slump, slump retention, workability, and flowability of the finished cement, hydrated cement, or cementitious product (e.g., concrete, mortar, shotcrete, etc.) made using the cement.

In an eighth example embodiment which is based on any of the first through seventh exemplary embodiments above, the method further comprises the at least one humidity sensor monitoring humidity level of air flow exiting from the air flow system through an exhaust chimney. For example, as shown in FIG. 1, this can be done by mounting an RH sensor at or within the chimney (34) of the air flow system.

In a ninth example embodiment which is based on any of the first through eighth embodiments above, the method further comprises the at least one humidity sensor being located within the vertical roller mill.

In a tenth example embodiment which is based on any of the first through ninth example embodiments above, the method further comprises the humidity of the air in the mill being measured using a humidity sensor positioned in the air flow system of the mill.

In a first aspect of the tenth example embodiment, the humidity sensor is positioned between the de-dusting equipment (31) and the main fan (32), such location being indicated as (22) in FIG. 1.

In an eleventh example embodiment which is based on any of the first through tenth example embodiments above, the method further comprises the at least one humidity sensor configured to provide an output corresponding to relative humidity (RH) values, and the RH values outputted directly from the humidity sensor or calculated by processor based on absolute moisture concentration in the air, temperature of the air, dew point of the air, or a combination of the foregoing.

In a first aspect of this eleventh exemplary embodiment, the method further comprises measuring dew point of air in the VRM or its air flow system (e.g., including chimney exhaust), and using this dew point measurement in conjunction with a temperature measurement to calculate the RH within the VRM or its associated air flow system.

In a twelfth example embodiment which is based on any of the first through eleventh embodiments above, the method further comprises, in step (C), the processor monitoring the vertical roller mill and accessing memory data chosen from relative humidity, pre-hydration level of cement, cement strength, set time of cement, and relationships between at least two of the foregoing.

In a first aspect of the twelfth example embodiment, the measured value of relative humidity (RH) is used to predict the pre-hydration level of the cement. This predicted pre-hydration level is used to predict a property chosen from the strength, initial set time, and final set time of hydrated cement or cementitious product.

In a thirteenth example embodiment which is based on any of the first through twelfth example embodiments above, the method further comprises, in step (C), the processor comparing the output from the at least one humidity sensor output with stored data sets or mathematical relationships reflecting a correlation or relationship between humidity and the compressive strength of hydrated cement or cementitious product cured to a specific age.

In a first aspect of the thirteenth example embodiment, the stored data sets or mathematical relationships reflect a correlation or relationship between humidity and the compressive strength of hydrated cement or cementitious product cured to a specific age chosen from 1-day, 2-day, 3-day, 7-day, 28-day, or combination thereof. For example, the specific ages may be 7-day and 28-day strength.

In a second aspect of the thirteenth example embodiment, the method provides a cementitious material which is a mortar, and the compressive strength of the mortar is measured using a standard method for conducting mortar strength testing as described by ASTM, EN, or other similar method.

In a third aspect of the thirteenth example embodiment, the method provides a cementitious material which is a concrete, and the compressive strength of the concrete is measured using a standard method for conducting concrete strength testing as described by ASTM, EN, or other similar method.

In a fourteenth example embodiment which is based on any of the first through thirteenth example embodiments above, the method further comprises, in step (C), the processor comparing the output from the at least one humidity sensor with stored datasets or mathematical relationships reflecting a correlation or relationship between humidity and the initial set time or final set time of hydrated cement or cementitious product.

In a fifteenth example embodiment which is based on any of the first through fourteenth example embodiments above, the method further comprises, in step (C), the processor receiving output from the at least one humidity sensor, and, based on comparing output from the at least one humidity sensor with a predetermined humidity threshold level or dataset, initiating a protocol whereby the air temperature inside of the mill is modified by adjusting the fresh air damper, hot gas damper, recirculation damper, chimney damper, HGG fuel consumption rate, speed of HGG fan, or a combination of any of the foregoing.

In a sixteenth example embodiment which is based on any of the first through fifteenth example embodiments above, the method further comprises, in step (C), the processor receiving output from the at least one humidity sensor, and, based on comparing output from the at least one humidity sensor with a predetermined humidity threshold level or dataset, initiating a protocol whereby the amount of fresh air entering the mill is modified by adjusting the fresh air damper, recirculation damper, chimney damper, hot gas damper, speed of the HGG fan, or a combination of any of the foregoing.

In a seventeenth example embodiment which is based on any of the first through sixteenth example embodiments above, the method further comprises, in step (C), the processor receiving output from the at least one humidity sensor, and, based on comparing output from the at least one humidity sensor with a predetermined humidity threshold level or dataset, initiating a protocol whereby the amount of total feed, or the proportion of clinker to secondary cementitious materials is adjusted, or any combination thereof.

An exemplary system for manufacture of cement comprises:
  (A) a vertical roller mill comprising: a grinding table for grinding particles comprising clinker and a sulfate source chosen from gypsum, plaster, calcium anhydrite, or blend thereof; at least one rotatable roller for providing rolling contact with the grinding table to grind the particles; a classifier for removing ground particles from the mill; air flow system to carry particles from the grinding table through the classifier; and at least one dispenser apparatus for introducing water, cement grinding aid, or both, onto the grinding table or the particles before or during grinding on the grinding table;
  (B) at least one humidity sensor that provides an output corresponding to moisture level of air inside the VRM or the air flow system;
  (C) a processor for comparing output from the at least one humidity sensor with (i) a predetermined humidity threshold level or range; (ii) at least one data set or mathematical relationship that contains correlations between humidity sensor output and one or more physical or chemical properties of the corresponding finished cement, hydrated cement, or cementitious product made with the cement; or (iii) both (i) and (ii); and
  (D) the processor programmed to initiate, based on the comparison, at least one protocol chosen from: (i) providing a visual or auditory alarm (that a humidity threshold value is met or exceeded); (ii) adjusting water, cement grinding aid, or both being dispensed onto the grinding table or the particles ground on the grinding table; (iii) adjusting air flow entering or exiting the grinding mill or air flow system; (iv) adjusting temperature of air inside the grinding mill or air flow system; (v) adjusting amount of materials introduced into the grinding mill; or (vi) a combination thereof.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

EXEMPLIFICATIONS

Example 1: Measuring Relative Humidity (RH) in VRM Air Flow System and Correlating to Pre-Hydration A field trial was conducted at a cement plant employing a vertical roller mill (VRM) to manufacture cement. An objective of the trial was to improve cement quality by reducing pre-hydration. Two strategies were employed to reduce the amount of moisture in the air inside the VRM. Adjustments to the mill airflow system were made to increase the amount of fresh, relatively dry air entering the system and to increase the amount of relatively moist air leaving the system via the chimney. These airflow adjustments were made in such a way that the rate of airflow through the VRM itself remained constant. The second strategy was to decrease the rate of water spray on the grinding table to a minimum safe level. By "safe," the present inventors refer to the intent that the mill vibrations do not exceed a maximum level set for the plant.

To measure the relative humidity (RH) of the air stream inside the chimney, a portable device for measuring relative humidity was used. This unit has an RH sensor located at the end of an 18-inch probe, allowing the sensor to be placed directly into an airstream within the airflow system. These RH measurements were taken when the ground cement was taken from the VRM.

Several cement samples were taken under different mill conditions such as different amounts of fresh air entering the system and different rates of water spray onto the grinding table. Three cement samples made with a commercial glycol-based grinding aid ("additive A") were collected on Day 1 of the field trial, and five cement samples made with a commercial alkanolamine-based grinding aid ("additive B") were collected on Day 2. Other factors such as the mill temperature, total airflow, and cement composition were maintained nearly constant. The pre-hydration level of the cement samples was measured using a thermogravimetric analysis (TGA) instrument.

FIG. 2 illustrates the pre-hydration level of all of the cement samples (Wk) plotted against the RH as measured in the flow within the chimney at the time the cement was manufactured. There is a close relationship between these values. This is because the pre-hydration of the cement particles occurs by chemical reaction between the cement particles and water vapor in the air stream that carries the particles through the mill. As RH increases, more reaction between cement and water molecules will occur.

As shown in FIG. 2, the correlation or relationship between Wk and RH can be described well by a linear fit. The relationship shown in FIG. 2 is a preferred aspect of the present invention, because it shows that by measuring the RH in the VRM or its air flow system, one can use a fit such as the one shown in FIG. 2 to predict the pre-hydration level of the cement being manufactured essentially in real time by continuously measuring the RH level in the VRM and air flow system. By comparison, measuring the pre-hydration directly using a TGA cannot be performed in real time or in situ, but rather requires collecting a cement sample and taking it to a laboratory for measurement, a labor-intensive process that requires on the order of one hour to complete.

In the latter case, by the time the information about the cement quality is obtained, it is no longer directly reflective of the cement being manufactured in the mill, since the mill conditions may have changed.

Example 2: Predicting Setting Time of Ground Cement from the Relative Humidity (RH) in the VRM Air Flow System For the present inventors, the ability to predict the pre-hydration level Wk of cement in real time during grinding operations, as a result of monitoring the RH moisture level in a VRM in real time, is a surprising and useful discovery. This arises because the Wk value has a direct relationship with cement properties such as setting time and strength.

Figure 4:
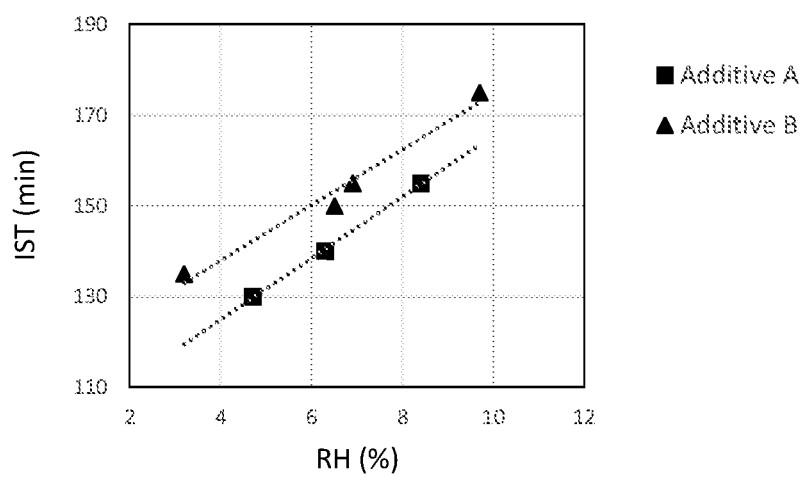
FIG. 4 is a graphic illustration of initial setting time (IST) plotted as a function of relative humidity (RH)

After the trial described in Example 1, the initial setting time (IST) was measured according to the EN 196-3 standard for all cement samples. FIG. 4 shows the initial setting time (IST) values plotted against the RH in the VRM air stream at the time each sample was collected. There is a close relationship, with lower RH values corresponding to lower setting times. Lower setting times are generally associated with higher cement quality, and correlate with a more reactive cement. The overall difference in setting time of about 30 minutes would be considered significant within the construction industry. The exact relationship between RH and IST is different for the two additives used as grinding aids, and arises due to different effects on the hydration process.

The present inventors believe that while the pre-hydration level of the cement helps to explain mechanistically these differences in setting time, they also believe that, as noted earlier, it is time-consuming and cumbersome to measure the Wk of the cement being produced by the VRM using TGA or other laboratory methods. Thus, the present inventors believe that the RH of the air in the mill is the preferred parameter for controlling and monitoring cement quality.

FIG. 4 illustrates that a measurement of the RH in the mill, combined with a knowledge of the specific grinding aid being used at that time, allows the setting time of the cement currently being manufactured to be predicted with a useful degree of accuracy.

Example 3: Using Relative Humidity and Pre-Hydration Level Together to Predict the Setting Time of Ground Cement A second way of predicting the initial setting time (IST) (or other cement property of interest) in real time while cement is being manufactured, which is slightly different than the method described above in Example 2, is to use the pre-hydration level of the cement as an intermediate step.

Figure 5:
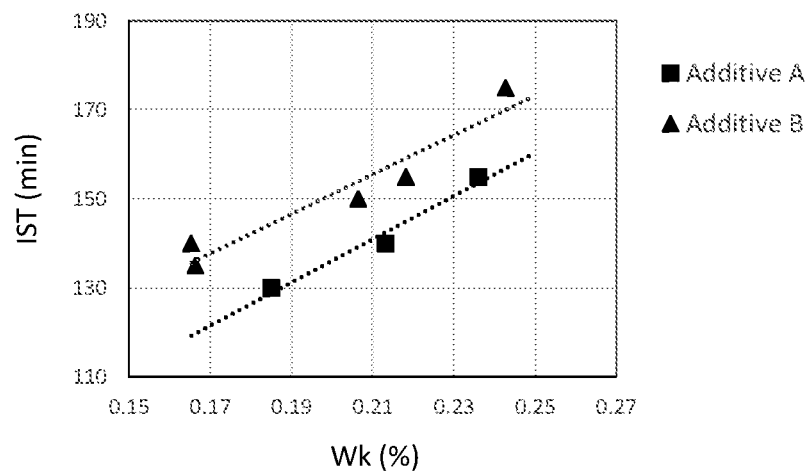
FIG. 5 is a graphic illustration of initial setting time (IST) plotted as a function of pre-hydration level (Wk)

With this second method, at least two relationships or correlations must first be established. The first relationship is between the RH of the air in the mill and the pre-hydration level of the cement. This relationship was already illustrated by FIG. 2. The second relationship is between the pre-hydration level (Wk) and the IST (or other cement property of interest). For the trial already described in Example 1, the IST values of the cement samples are plotted against the Wk values in FIG. 5. The relationship between IST and Wk can be described by linear fits that are slightly different depending on the grinding aid that was used.

Once these relationships have been established, prediction of IST from the real time measurement of RH can be accomplished through the following steps:

Measure the RH of the air in the VRM airflow system;
Predict the pre-hydration level (Wk) of the cement using the pre-established correlation or relationship between RH and Wk (e.g. FIG. 2); and
Predict the IST of the cement using the pre-established correlation or relationship between Wk and IST (e.g. FIG. 5).

Figure 6:
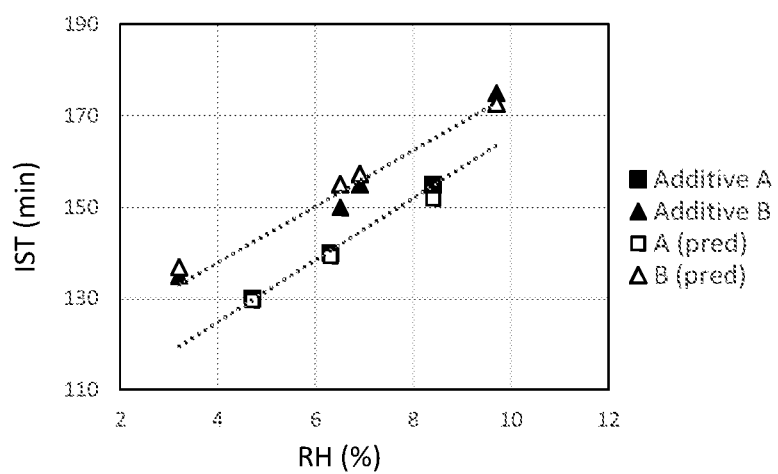
FIG. 6 is a graphic illustration of measured and predicted initial setting time (IST) as a function of relative humidity (RH) of cement samples made with grinding aids A and B.

FIG. 6 illustrates the results of applying this second method. The solid markers are the measured IST values and the open markers are the predicted IST values using the method described above. The predictions imply a good degree of accuracy.

Taking the above into account, the present inventors believe that sufficiently accurate and reliable prediction of initial setting time (IST) or other cement property of interest could involve the following exemplary steps:

Measure the relative humidity (RH) in the VRM airflow system;
Predict the pre-hydration level (Wk) using a pre-established relationship between RH and Wk;
Predict the fineness of the cement from a pre-established relationship between classifier speed and cement fineness; and
Predict the IST (or other cement property of interest) using pre-established relationships between Wk and IST, fineness and IST, grinding aid and IST, and cement composition and IST.

Example 4: Predicting the Strength of Cement from the Relative Humidity (RH) in the VRM Air Flow System This example is similar to Example 2, but describes a prediction of compressive strength rather than setting time.

Figure 7:
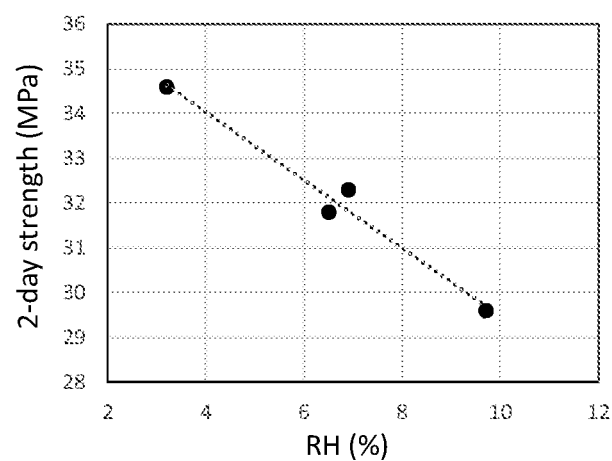
FIG. 7 is a graphic illustration of two-day strength of cement samples made with grinding aid B, as plotted against relative humidity (RH)

After the trial described in Example 1, the cement samples made with Additive B (an alkanolamine-based grinding aid) were tested for compressive strength at the age of two days following the EN 196-1 standard for compression testing of mortar samples. FIG. 7 shows the 2-day strength values plotted against the RH in the VRM air stream at the time each sample was collected. There is a close relationship, with lower RH values corresponding to higher strengths. Higher strengths are an indication of a more reactive cement and higher cement quality. The overall variation of the 2-day strength values is in the range of 4-5 MPa, would be deemed significant within the construction industry.

The present inventors believe that while the pre-hydration level of the cement helps to explain mechanistically these differences in compressive strength, they also believe that, as noted earlier, it is time-consuming and cumbersome to measure the Wk of the cement being produced by the VRM using TGA or other laboratory methods. Thus, the present inventors believe that the RH of the air in the mill is the preferred parameter for controlling and monitoring cement quality.

FIG. 7 illustrates that a measurement of the RH in the mill, combined with a knowledge of the specific grinding aid being used at that time, allows the early strength of the cement currently being manufactured to be predicted with a useful degree of accuracy.

Example 5: Using Relative Humidity and Pre-Hydration Level Together to Predict the Strength of Cement This example is similar to Example 3, but describes a prediction of compressive strength rather than setting time.

A second way of predicting the strength in real time while cement is being manufactured, which is slightly different than the method described above in Example 4, is to use the pre-hydration level of the cement as an intermediate step.

Figure 8:
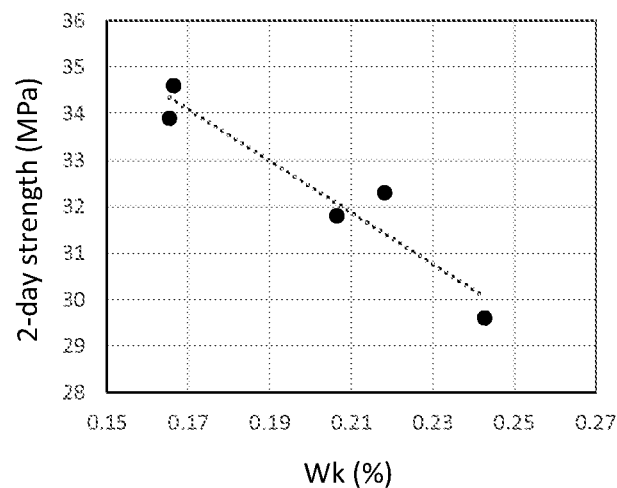
FIG. 8 is a graphic illustration of two-day strength as a function of pre-hydration level (Wk)

With this second method, at least two relationships or correlations must first be established. The first relationship is between the RH of the air in the mill and the pre-hydration level of the cement. This relationship was already illustrated by FIG. 2. The second relationship is between the pre-hydration level (Wk) and the strength. For the trial already described in Example 1, the 2-day strength values of the cement samples made with Additive B are plotted against the Wk values in FIG. 8. The relationship between 2-day strength and Wk can be described by a linear fit.

Once these relationships have been established, prediction of strength from the real time measurement of RH can be accomplished through the following steps:

Measure the RH of the air in the VRM airflow system;
Predict the pre-hydration level (Wk) of the cement using the pre-established correlation or relationship between RH and Wk (e.g. FIG. 2); and
Predict the strength of the cement using the pre-established correlation or relationship between Wk and strength (e.g. FIG. 8).

Figure 9:
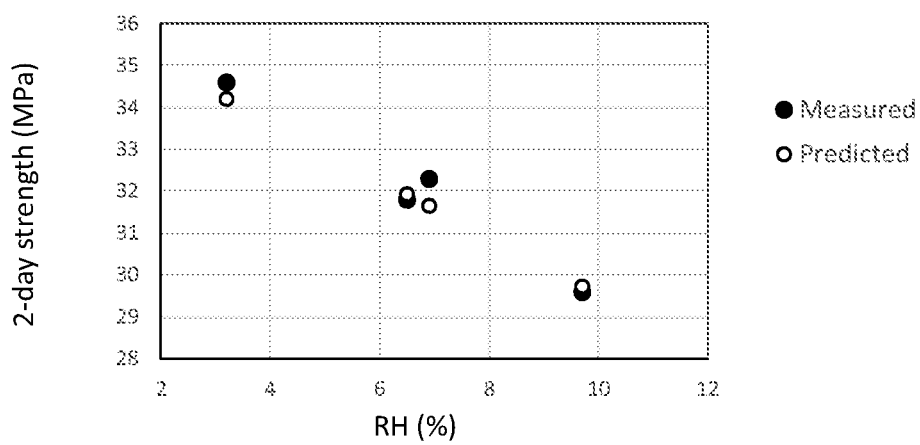
FIG. 9 is a graphic illustration of measured and predicted two-day strength as a function of relative humidity (RH)

FIG. 9 illustrates the results of applying this second method. The solid markers are the measured 2-day strength values and the open markers are the predicted 2-day strength values obtained by using the method described above. The present inventors believe that there is an excellent agreement between the predicted and measured strength values of the cement.

As was already detailed in Example 3 related to IST, a more complete and robust exemplary method of the present invention for predicting the strength of the cement in real time would comprise the following steps:

Measure relative humidity (RH) in the mill;
Use an established relationship between RH and Wk (e.g. FIG. 2) to predict the Wk;
Predict the fineness of the cement from an established relationship between separator speed and fineness; and
Use established relationships between Wk and strength, fineness and strength, grinding aid and strength, and cement composition and strength to predict the strength of the cement being manufactured.

Example 6: Continuous Measurement and Logging of Relative Humidity (RH) in VRM Air Flow System and Correlation to VRM Operation An RH logging unit was used for monitoring the air stream inside the chimney (34 in FIG. 1) of a VRM air flow system which recirculated air flow back into the VRM. A portable unit having an RH sensor located at the end of an 18-inch probe allowed the RH sensor to be placed directly into the airstream of the VRM chimney 34. The probe was installed in the chimney 34 using an available access port, taking care to seal the space around the probe to prevent outside air from affecting the measurement. The unit was programmed to measure the RH, the absolute humidity, and the temperature every 30 seconds, and to save this data to internal memory (e.g., 53).

The present inventors note that the VRM employed a hot gas generator (HGG) to maintain the internal temperature of the VRM at the desired value (See HGG at 37 in FIG. 1). A HGG is often required when the clinker entering the VRM is relatively cool.

Figure 10:
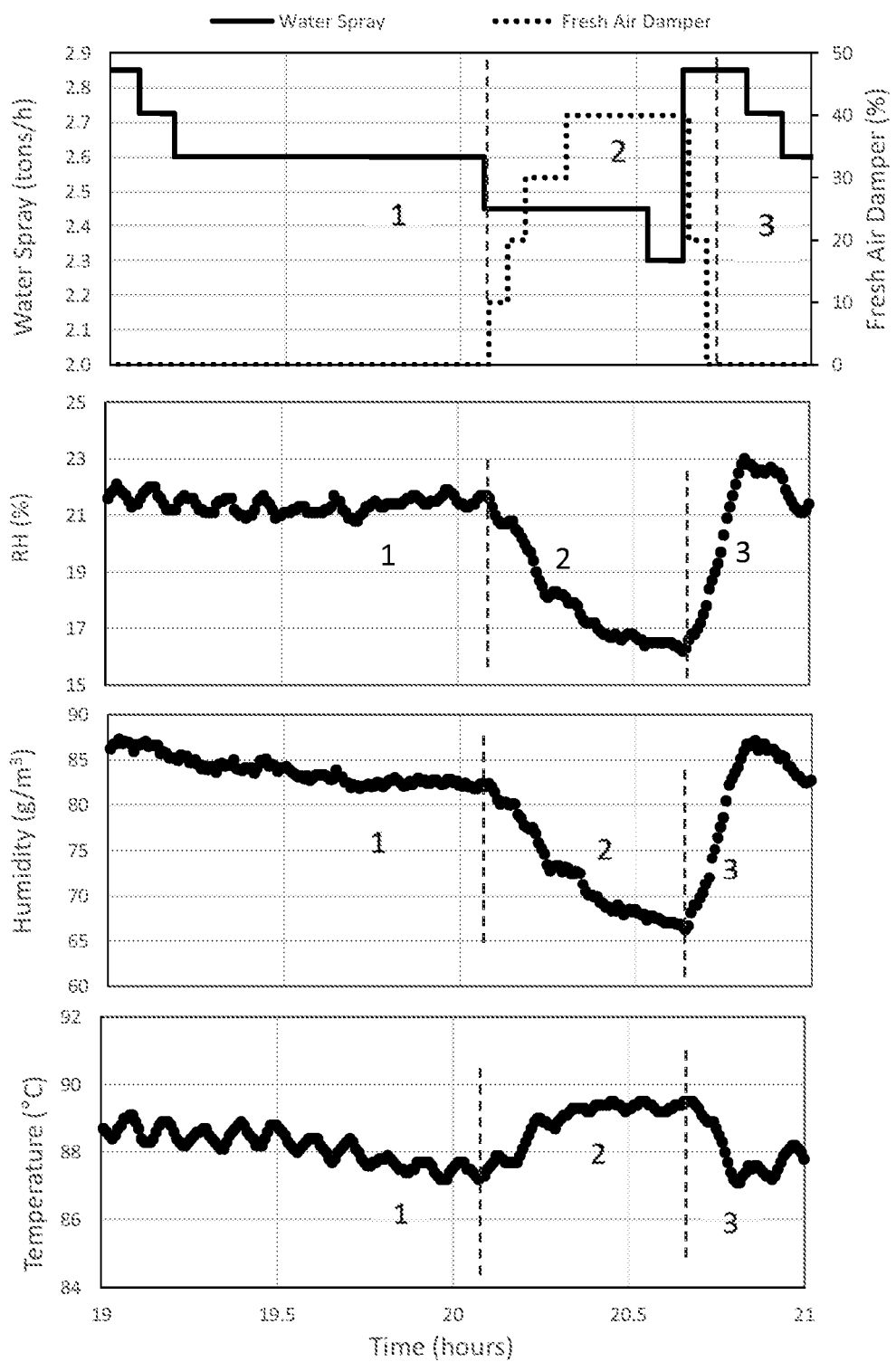
FIG. 10 is a graphic illustration of exemplary process conditions inside a VRM. The top graph shows the amount water spray onto the VRM grinding table (left axis) and the amount of fresh air entering the VRM through the fresh air damper (right axis) as a function of time. The next three graphs show the relative humidity, absolute humidity, and temperature each monitored as a function of time inside the VRM air flow system during the same time period as illustrated in the top graph.

While the RH data logger was in place, various adjustments were made to the mill operation, so that their effect on the moisture and temperature properties of the VRM airstream could be measured. These results are plotted in the graphs of FIG. 10. The topmost graph of FIG. 10 shows the adjustments that were made to the amount of water spray (on the left axis) and to the amount of fresh air entering the mill through the fresh air damper (right axis) during a 2-hour period. The next three graphs in FIG. 10 show, from top to bottom, the relative humidity (RH), absolute humidity ($g/m^3$), and temperature data collected during the same two-hour period. Three time periods of interest designated as "1," "2," and "3" are indicated in FIG. 10.

Period 1: During the first period, the mill is in stable operation and the amount of water spray onto the VRM grinding table is slowly reduced. Because water spray cools the mill as a result of evaporation, the flow of hot gas from the HGG was slowly reduced to compensate for the reduced water spray, so as to maintain constant temperature. The net effect was a slight decline in temperature during this period. As a consequence of the water spray reduction, the absolute humidity also decreased slightly. The trends in temperature and absolute humidity had opposite effects on the RH, so the net effect was that RH remained constant at approximately 21% during Period 1.

Period 2: During this second period, the water spray on the table was further reduced. In addition, the air flow in the VRM was adjusted to increase the amount of fresh air entering the VRM and also to increase the amount of air leaving the VRM through the chimney. Both of these changes have the effect of reducing relative humidity (RH), and as can be seen from the RH graph in FIG. 10, RH drops significantly from ~21% to ~16% in Period 2. The absolute humidity also drops significantly. The reduction of water spray tends to increase temperature, while the increase in fresh air tends to decrease temperature. The net effect was a small increase in temperature during this second period.

Period 3: During this period, the operational changes made to the VRM during the second period were rapidly reversed. The water spray was increased and the fresh air flow was decreased, bringing both parameters back to the levels present during the first period. As a result, the RH and absolute humidity levels increase sharply during Period 3, returning close to the values seen at the start of Period 1.

The present inventors believe that this example illustrates how a properly installed humidity sensor with data logging capabilities can be used to measure, in real time, the effects of various mill adjustments and their effects on the RH in the VRM. Changes in water spray level and the amount of fresh air entering the mill are observed to have significant and easily measured effects on the RH.

In addition, monitoring the absolute humidity and temperature as well as RH allows a determination about whether measured changes in RH arise from change in the amount of moisture entering or leaving the mill, a change in the temperature within the mill, or a combination of factors.

Example 7: Effect of RH and Temperature on Pre-Hydration

Both the temperature and amount of water spray in the VRM were varied and considered as part of this field trial test. Three cement samples were collected from the VRM grinding operation, and the corresponding temperature and water spray values are listed below in Table 1.

TABLE 1

Mill Conditions and Pre-Hydration Levels of Cement Samples from VRM

| Sample No. | Outlet Temperature (° C.) | Table Water Spray (tons/h) | $H_{abs}$[a] (g/m³) | $RH$[b] (%) | Wk (%) | IST (min) |
|---|---|---|---|---|---|---|
| 1 | 105 | 1.4 | 69.9 | 10.0 | 0.240 | 210 |
| 2 | 99 | 1.3 | 64.9 | 11.3 | 0.274 | 225 |
| 3 | 95 | 1.1 | 54.9 | 11.0 | 0.265 | 225 |

[a] $H_{abs}$ refers to an estimate of absolute humidity.
[b] Relative Humidity (RH) as calculated from temperature and $H_{abs}$.

In this trial, the RH and absolute humidity were not measured. However, the absolute humidity level can be estimated based on the amount of water spray and previous experience with VRM operation. The accuracy of this estimation is not critical to this example. The RH can then be calculated from the temperature and absolute humidity values, using well established formulas. The resulting absolute humidity and RH values are also listed in the above table, as well as the pre-hydration level, Wk. The pre-hydration level was measured in a laboratory after the field trial using a TGA instrument.

The results shown in the above table provide some insight into whether the absolute humidity level in the air, the amount of water spray in the grinding table, or the relative humidity of the air has the most direct correlation to pre-hydration. Since sample #1 has the highest water spray and absolute humidity, if these parameters were most critical then it would be expected that sample #1 would have the highest pre-hydration level. However, sample #1 actually has the lowest measured pre-hydration level, as well as the shortest initial setting time (IST). In fact, the RH has the best correlation to Wk, with higher RH giving higher Wk, as expected.

Figure 11:
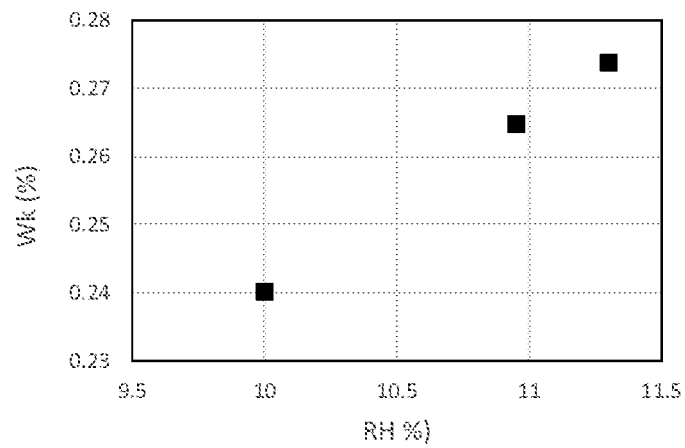
FIG. 11 is a graphic illustration of pre-hydration level (Wk) for cement samples collected from a VRM at different temperatures, plotted as a function of relative humidity (RH)

FIG. 11 graphically illustrates this relationship. Pre-hydration level (Wk) was plotted against the calculated RH values for the cement samples collected from a VRM at different temperatures and water spray levels (see Table 1 above). Because RH correlates most closely to Wk, the present inventors believe that it will also provide excellent correlations and enable predictions of performance and/or properties such as setting time and strength. Therefore, the present inventors prefer the use of relative humidity levels (RH) for monitoring and controlling VRM operation.

Example 8: Impact of Grinding Aid Dosage and Composition on Limiting Water Spray in a VRM A field trial was conducted within a VRM for finish grinding of cement. The objective was to improve cement quality by reducing pre-hydration. The plant had been operating without the use of a grinding aid, and required 3.5% water spray to control the VRM vibrations to an acceptable limit. Note the 3.5% is based on the water spray per mass of VRM feed material. To reduce pre-hydration of the cement, the quantity of water spray needed to be reduced; but a decrease below 3.5% would lead to mill vibrations that would exceed the acceptable vibration limit and potentially damage the VRM. Therefore, in order to reduce the water spray, grinding aids were utilized during the trial to help control mill vibrations and reduce water spray.

For the trial, two different grinding aids were used at multiple dosages, a mostly glycerol and a combination of equal parts glycerol and triisopropanolamine (TIPA) grinding aids.

Figure 12:
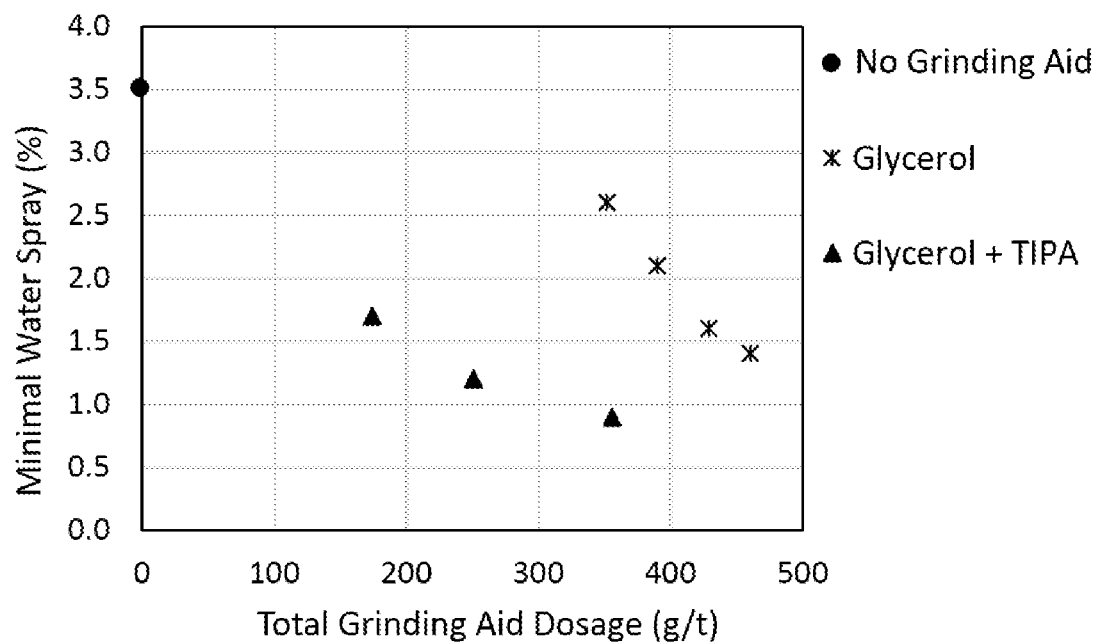
FIG. 12 is a graphic illustration of the minimum water spray needed for stable VRM operation plotted as a function of grinding aid dosage, for two different grinding aids.

FIG. 12 shows the minimum quantity of water spray needed to control the mill vibrations plotted against the grinding aid dosage. Clearly, both grinding aids help to control VRM vibrations allowing the water spray to be reduced. Furthermore, the higher the grinding aid dosage, the greater the beneficial effect. This figure illustrates the utility of a control system that can optimize the grinding aid dosage to achieve the water spray level required to reach a desired value of RH.

FIG. 12 also illustrates how grinding aids with different chemical compositions can have very different dosage efficiencies for controlling VRM vibrations. The grinding aid containing a combination of glycerol and TIPA requires a much lower dosage to achieve a given water spray reduction as compared to the grinding aid containing mostly glycerol.

The foregoing example and embodiments are presented for illustrative purposes only and are not intended to limit the scope of the invention.

It is claimed:
1. A system for manufacture of cement, comprising:
(A) a vertical roller mill comprising:
 a grinding table for grinding particles comprising clinker and a sulfate source chosen from gypsum, plaster, calcium anhydrite, or a blend thereof;
 at least one rotatable roller for providing rolling contact with the grinding table to grind the particles;
 a classifier for removing ground particles from the vertical roller mill;
 an air flow system to carry particles from the grinding table through the classifier; and
 at least one dispenser apparatus for introducing water, cement grinding aid, or both, to contact the particles;
(B) at least one humidity sensor that provides a humidity output corresponding to a moisture level of air inside the vertical roller mill or the air flow system;
(C) a processor for comparing the humidity output from the at least one humidity sensor with at least one selected from the group consisting of
 (i) a predetermined humidity threshold level or at least one pre-established relationship between relative humidity and one or more cement property of interest, wherein the predetermined humidity threshold level and the at least one pre-established relationship is selected based on correlations between the humidity output and one or more physical or chemical properties of the corresponding finished cement, hydrated cement, or cementitious product made with the cement;
 (ii) at least one data set or mathematical relationship that contains correlations between the humidity sensor output and one or more physical or chemical properties of the corresponding finished cement, hydrated cement, or cementitious product made with the cement; and
 (iii) both (i) and (ii), wherein
 the processor is programmed to initiate, based on the comparison, at least one protocol chosen from: (i) providing a visual or auditory alarm; (ii) adjusting water, cement grinding aid, or both being dispensed onto the grinding table or the particles ground on the grinding table; (iii) adjusting air flow entering or exiting the vertical roller mill or the air flow system; (iv) adjusting temperature of air inside the vertical roller mill or air flow system; (v) adjusting amount of materials introduced into the vertical roller mill; or (vi) a combination thereof.

2. The system of claim 1 further comprising, a vibration sensor that senses vibration of the vertical roller mill and provides a vibration output indicative of vibration level.

3. The system of claim 2, wherein the processor receives the humidity output from the at least one humidity sensor, and, based on comparing the humidity output from the at least one humidity sensor with a predetermined humidity threshold level or dataset, initiates a protocol whereby water amounts introduced into the vertical roller mill or onto the particles being ground in the vertical roller mill are reduced, while cement grinding aid amounts introduced into the vertical roller mill or onto the particles being ground in the vertical roller mill are increased, and/or the grinding aid composition is changed.

4. The system of claim 3, wherein the processor receives the humidity output from the at least one humidity sensor and initiates adjustments to water level and cement grinding aid amount dispensed into the vertical roller mill, said adjustment being limited by a vibration level limit or predetermined maximum value.

5. The system of claim 1, wherein the processor receives the humidity output from the at least one humidity sensor and compares the humidity output to a predetermined humidity threshold level or dataset at successive intervals of no greater than every 60 minutes.

6. The system of claim 1, wherein the one or more physical or chemical properties are chosen from pre-hydration level, compressive strength, initial setting time, final setting time, slump, slump retention, workability, and flowability of the finished cement, hydrated cement, or cementitious product made using the cement.

7. The system of claim 1, wherein the at least one humidity sensor monitors humidity level of air flow exiting from the air flow system through an exhaust chimney.

8. The system of claim 1, wherein the at least one humidity sensor is located within the vertical roller mill.

9. The system of claim 1, wherein the at least one humidity sensor is positioned in the air flow system of the vertical roller mill.

10. The system of claim 1, wherein the at least one humidity sensor is configured to provide a relative humidity output corresponding to relative humidity values, and the relative humidity values are outputted directly from the at least one humidity sensor or calculated by the processor based on absolute moisture concentration in the air, temperature of the air, dew point of the air, or a combination thereof.

11. The system of claim 1, wherein the processor compares the humidity output from the at least one humidity sensor with the at least one data set or mathematical relationship that contains correlations between the humidity output and compressive strength of hydrated cement or cementitious product cured to a specific age.

12. The system of claim 1, wherein the processor compares the humidity output from the at least one humidity sensor with at least one data set or mathematical relationship that contains correlations between humidity sensor output and initial set time or final set time of hydrated cement or cementitious product.

13. The system of claim 1, wherein the processor receives the humidity output from the at least one humidity sensor, and, based on comparing the humidity output from the at least one humidity sensor with the predetermined humidity threshold level or dataset, initiates a protocol whereby the air temperature inside of the mill is modified by adjusting the fresh air, hot gas, recirculation, chimney damper, hot gas generator fuel consumption rate, speed of hot gas generator fan, or a combination thereof.

14. The system of claim 1, wherein the processor receives the humidity output from the at least one humidity sensor, and, based on comparing the humidity output from the at least one humidity sensor with a predetermined humidity threshold level or dataset, initiates a protocol whereby the amount of fresh air entering the mill is modified by adjusting the fresh air, recirculation, chimney, hot gas damper, speed of the hot gas generator fan, or a combination of any of the foregoing.

15. The system of claim 1, wherein the processor receives the humidity output from the at least one humidity sensor, and, based on comparing the humidity output from the at least one humidity sensor with the predetermined humidity threshold level or dataset, initiates a protocol whereby the amount of total feed, the proportion of clinker to secondary cementitious materials, or the sulfate level is adjusted, or any combination thereof.

16. The system of claim 1 wherein the processor receives output from the at least one humidity sensor and compares the output to a predetermined humidity threshold level or dataset at successive intervals of no greater than every 60 seconds.

* * * * *